(12) United States Patent
Morisco et al.

(10) Patent No.: US 11,322,999 B2
(45) Date of Patent: May 3, 2022

(54) ELECTRIC MOTOR

(71) Applicant: Robert Bosch GmbH, Stuttgart (DE)

(72) Inventors: David Philipp Morisco, Stuttgart (DE); Jens Burghaus, Stuttgart (DE)

(73) Assignee: Robert Bosch GbmH, Stuttgart (DE)

( * ) Notice: Subject to any disclaimer, the term of this patent is extended or adjusted under 35 U.S.C. 154(b) by 68 days.

(21) Appl. No.: 16/966,925

(22) PCT Filed: Nov. 28, 2018

(86) PCT No.: PCT/EP2018/082776
§ 371 (c)(1),
(2) Date: Aug. 3, 2020

(87) PCT Pub. No.: WO2019/149402
PCT Pub. Date: Aug. 8, 2019

(65) Prior Publication Data
US 2021/0050755 A1 Feb. 18, 2021

(30) Foreign Application Priority Data
Feb. 1, 2018 (DE) .................. 10 2018 201 537.6

(51) Int. Cl.
| | |
|---|---|
| *H02K 1/30* | (2006.01) |
| *H02K 1/276* | (2022.01) |
| *H02K 5/08* | (2006.01) |
| *H02K 7/00* | (2006.01) |
| *H02K 15/10* | (2006.01) |

(52) U.S. Cl.
CPC ............. *H02K 1/30* (2013.01); *H02K 1/2766* (2013.01); *H02K 5/08* (2013.01); *H02K 7/003* (2013.01); *H02K 15/10* (2013.01)

(58) Field of Classification Search
CPC .......... H02K 1/30; H02K 1/2766; H02K 5/08; H02K 7/003; H02K 15/10
USPC ........................................... 310/261.1
See application file for complete search history.

(56) References Cited

U.S. PATENT DOCUMENTS

| | | |
|---|---|---|
| 3,477,125 A | 11/1969 | Schwartz |
| 2008/0313884 A1 | 12/2008 | Jeung |

FOREIGN PATENT DOCUMENTS

| | | |
|---|---|---|
| CN | 1189712 A | 8/1998 |
| CN | 1351403 A | 5/2002 |
| CN | 206250866 U | 6/2017 |

(Continued)

OTHER PUBLICATIONS

International Search Report for Application No. PCT/EP2018/082776 dated Feb. 13, 2019 (English Translation, 2 pages).

*Primary Examiner* — Terrance L Kenerly
(74) *Attorney, Agent, or Firm* — Michael Best & Friedrich LLP

(57) ABSTRACT

The present invention relates to an electric motor (1) comprising a rotor main body (2), to which a plurality of permanent magnets (3) or a rotor winding can be attached, and a shaft (4) for receiving the rotor main body (2), characterized in that an isolation body (5) is arranged between the shaft (4) and the rotor main body (2) to electrically isolate the rotor main body (2) from the shaft (4), in that the isolation body (5) engages at least partially into the shaft (4) and into the rotor main body (2) in order to connect the shaft (4) and rotor main body (2) for conjoint rotation, and in that the isolation body (5) is made from a composite of ceramic and plastic.

12 Claims, 3 Drawing Sheets

(56) References Cited

FOREIGN PATENT DOCUMENTS

| | | |
|---|---|---|
| DE | 1037572 | 8/1958 |
| JP | 2015159647 | 9/2015 |

ELECTRIC MOTOR

BACKGROUND OF THE INVENTION

The present invention relates to an electric motor. In particular, the invention relates to an embodiment of the shaft-hub connection of the rotor of the electric motor.

Electric motors in particular three-phase machines having permanent magnets that render possible a high power density and high torques are known from the prior art. Machine parts of electric motors that carry a magnetic flux in a concentrated manner are constructed from stacked electric sheets. Such a machine part is in particular a rotor stack to which the permanent magnets are attached. The rotor stack is attached to a shaft. The shaft is used to transmit a rotary movement of the rotor main body outward out of the three-phase machine and is usually manufactured from steel. The rotor stack is connected to a shaft or hub in a rotationally-fixed manner so as to transmit torque, wherein the connection is produced by way of a press-fit that simultaneously establishes a connection site for eddy currents.

SUMMARY OF THE INVENTION

So-called electro-pitting that may occur in ball bearings that are provided for mounting the shaft is avoided by way of the electric motor in accordance with the invention. Said electro-pitting occurs if eddy currents are directed out of the rotor main body via the shaft to the ball bearings and cause electrical discharges there. In accordance with the invention, this is avoided by way of an electrical insulation between the shaft and the rotor main body.

The electric motor in accordance with the invention comprises a rotor main body to which either a plurality of permanent magnets or a rotor winding may be attached. If the rotor main body has a rotor winding, then slip rings in particular are required in order to transmit electrical energy to the winding. It is therefore preferred to provide permanent magnets. In addition, the electric motor has a shaft for receiving the rotor main body. An insulating body is attached between the shaft and the rotor main body. As a consequence, the rotor main body is electrically insulated from the shaft. Furthermore, it is provided that the shaft and the rotor main body are connected to one another in a rotationally-fixed manner by the insulating body. This is realized by virtue of the fact that the insulating body engages at least in part into the shaft and the rotor main body, as a result of which the rotationally-fixed connection between the rotor main body and the shaft is established. Consequently, the insulating body has two purposes: on the one hand an electrical insulation of shaft and rotor main body with respect to one another is realized, on the other hand a rotationally-fixed connection of the rotor main body and the shaft is realized, in particular by way of a positive-locking connection. Consequently, the press-fit that is known from the prior art and by way of which it would not be possible to provide an electrical insulation is omitted. The insulating body is manufactured from a compound of a ceramic material and a synthetic material. The portion of the ceramic material increases a mechanical strength of the insulating body. The synthetic material is used advantageously to provide the electrical insulation. In addition, a serviceable life of the rotationally-fixed connection is increased by using the ceramic material, since if only a synthetic material were to be used, this would result in this synthetic material losing strength as a result of temperature fluctuations over a long period of time. Consequently, the shaft-hub connection would fail, which is compensated for by the reinforcing portion of the ceramic material.

It is preferably provided that the insulating body has a ceramic core having at least in part a synthetic material jacket. The ceramic core is consequently advantageously used to receive loads whereas the synthetic material jacket ensures an electrical insulation. In particular, a volume of the ceramic core is greater than a volume of the synthetic material jacket. Consequently, the insulating body has a high strength and may thus transmit high torques between the shaft and the rotor main body.

The ceramic core is particularly advantageously designed as a press ring. This means that the ceramic core has an annular shape and is connected to the shaft via an interference fit assembly. Consequently, it is possible in particular in addition to the previously described positive-locking connection to also establish an at least in part functioning non-positive locking connection.

It is preferred that the rotor main body and/or the shaft have at least one groove, wherein the groove extends along a center axis of the shaft. The insulating body engages in this at least one groove. In a particularly advantageous manner, both the shaft and also the main body each have at least one groove, wherein the insulating body engages into the two grooves. This results in the said rotationally-fixed connection. In a particularly advantageous manner, both the rotor main body and also the shaft have multiple such grooves.

In a particularly advantageous embodiment, the at least one groove has a constant or changing cross-section along the center axis. The cross-section may either change continuously or in steps. The cross-section may also initially reduce along the course of the center axis and subsequently increase back in size. By way of the variable change in the cross-section along the center axis, the rotor main body is fixed in an axial manner with respect to the insulating body and/or results in the shaft being fixed in an axial manner with respect to the insulating body. Consequently, either the insulating body may be fixed in an axial manner, in other words along a direction of the center axis of the shaft, or the entire rotor main body may fixed in an axial manner with respect to the shaft.

In a further preferred embodiment, it is provided that the insulating body extends in the shape of a star into the rotor main body. The term 'shape of a star' is understood to mean that the insulating body extends in an annular manner, wherein protrusions protrude radially outward from the annular shape. It is likewise possible that the protrusions extend radially inward. In this manner, on the one hand a rotationally-fixed connection between the insulating body and the rotor main body is realized. On the other hand, it is rendered possible to guide a magnetic flux within the rotor main body. The magnetic flux is guided in particular on account of the properties of the ceramic material portion of the insulating main body. Since ceramic material has mainly low permeability properties, in other words a low magnetic conductivity, the insulating body may not only act in an electrically insulating manner but also act in a magnetically insulating manner.

The insulating body has advantageously at least one extreme site with a greatest radial extension. The term 'radial extension" is understood to mean a dimension in the perpendicular direction, in other words in a radial manner with respect to the center axis of the shaft. The extreme site is provided at an angle range around the center axis on which a permanent magnet is also provided on the rotor main body.

In particular, the permanent magnet is attached at said angle range at a site where the spacing of said permanent magnet with respect to the shaft is the smallest. If the spacing of the permanent magnet along its length with respect to the center axis of the shaft is different, the angle range thus corresponds in particular to the range at which the spacing of the permanent magnet with respect to the shaft and consequently with respect to the center axis of the shaft is the smallest.

The insulating body has advantageously a concave area between two extreme sites. It is preferred that the concave area has a round or oval shape. It is consequently rendered possible to guide a magnetic flux within the rotor main body in an optimal manner. This means that the magnetic flux can extend from a permanent magnet, in other words from one extreme site of the insulating body, along the concave area to a further permanent magnet, in other words to a further extreme site of the insulating body. It is thus possible to optimize the magnetic flux.

In a preferred embodiment, it is provided that the magnetic flux is guided within the rotor main body along a predefined path. This is realized in particular by way of the previously described measures. In particular, the rotor main body is impaired as far as its magnetic conductivity is concerned by the insulating body. It is preferred that the insulating body has a magnetic insulating effect since the insulating body is not magnetically conductive or is only slightly conductive. This results in the magnetic flux not being able to flow through the insulating body, as a result of which the magnetic flux may be adapted within the rotor main body. It is thus possible by correspondingly shaping the insulating body to realize that the magnetic flux within the base body runs along a predefined path.

The synthetic material portion of the insulating body may be in particular a thermosetting plastic or a thermoplastic. In particular, the synthetic material is designed in an electrically insulating manner and is thus used to insulate the rotor main body from the shaft.

BRIEF DESCRIPTION OF THE DRAWINGS

Exemplary embodiments of the invention are described below with reference to the accompanying drawing. In the drawing.

DETAILED DESCRIPTION

Figure 1:
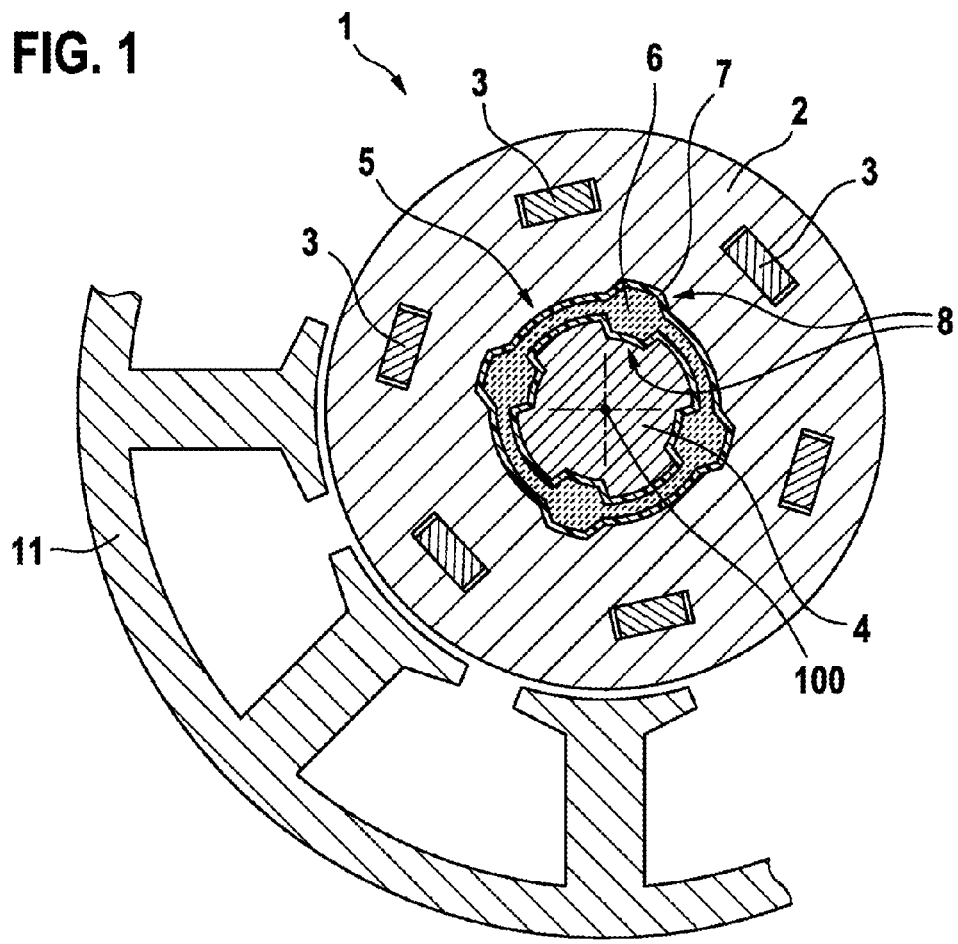
FIG. 1 illustrates a schematic view of an electric motor in accordance with an exemplary embodiment of the invention.

FIG. 1 illustrates schematically an electric motor 1. The electric motor 1 comprises a rotor having a rotor main body 2 and a shaft 4. In addition, the electric rotor 1 comprises a stator 11 for driving the rotor.

The rotor main body 2 is manufactured from stacked electric sheets. The rotor main body 2 is used to receive permanent magnets 3. Alternatively, the rotor main body 2 may also be designed so as to receive a rotor winding. The shaft 4 is manufactured from steel. In order to realize an electrical insulation between the rotor main body 2 and the shaft 4, an insulating body 5 is arranged between the rotor main body 2 and the shaft 4 with the result that contact between the rotor main body 2 and the shaft 4 is prevented.

By way of the insulating body 5, a rotationally-fixed connection is established between the shaft 4 and the rotor main body 2, in that the insulating body 5 engages at least in part into the shaft 4 and the rotor main body 2. In particular, a positive-locking connection is thus realized between the insulating body 5 and the shaft 4 and between the insulating body 5 and the rotor main body 2. The rotationally-fixed connection between the rotor main body 2 and the shaft 4 is used to transmit torque between the rotor main body 2 and the shaft 4. As a consequence, any rotation of the rotor main body 2 that is initiated by the stator 11 may be output from the electric motor 1.

In order to realize the connection between the shaft 4 and the rotor main body 2 by way of the insulating body 5, individual grooves 8 are provided both in the shaft 4 and also in the rotor main body 2. The insulating body 5 engages into these grooves 8.

The insulating body 5 is manufactured from a compound of a ceramic material and a synthetic material. The insulating body 5 thus comprises a ceramic core 6 that is surrounded by a synthetic material jacket 7. The ceramic core 6 is used in particular to transmit torque from the rotor main body 2 to the shaft 4, since the ceramic core 6 has a higher strength than the synthetic material jacket 7. The synthetic material jacket 7 is used primarily as an electrical insulation between the shaft 4 and the rotor main body 2.

The ceramic core 6 has in addition a low magnetic conductivity, as a result of which it is possible to guide the magnetic flux within the rotor main body 2. This is illustrated below in FIGS. 2 to 6.

Figure 2:
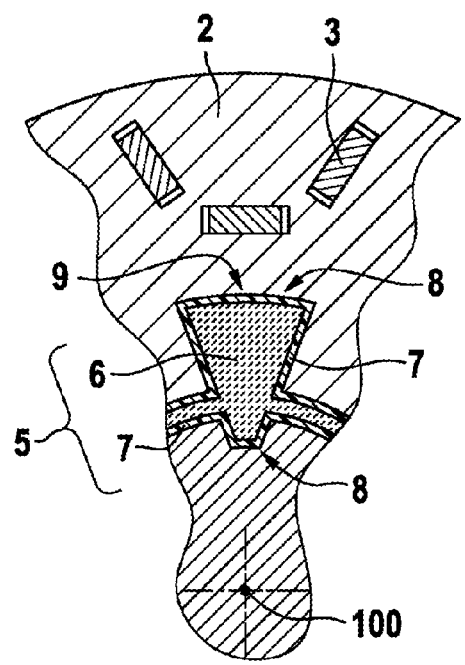
FIG. 2 illustrates a schematic view of a rotor of the electric motor in accordance with the exemplary embodiment in a first alternative.
Figure 3:
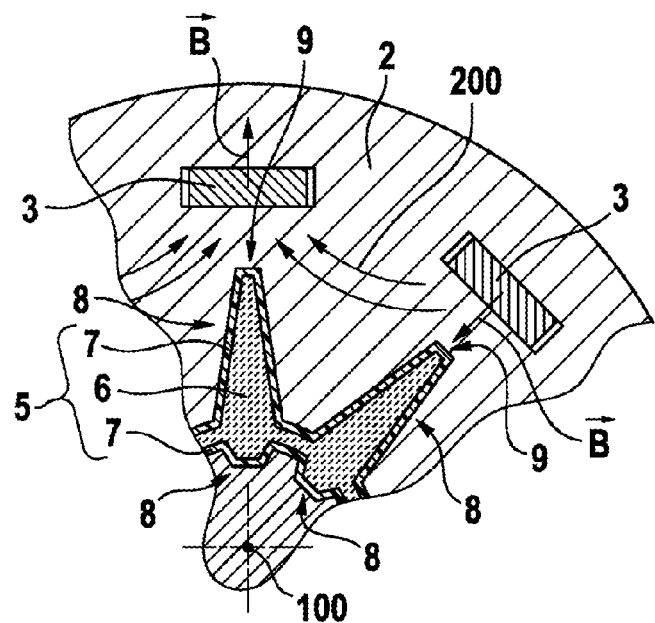
FIG. 3 illustrates a schematic view of a rotor of the electric motor in accordance with the exemplary embodiment in a second alternative.
Figure 4:
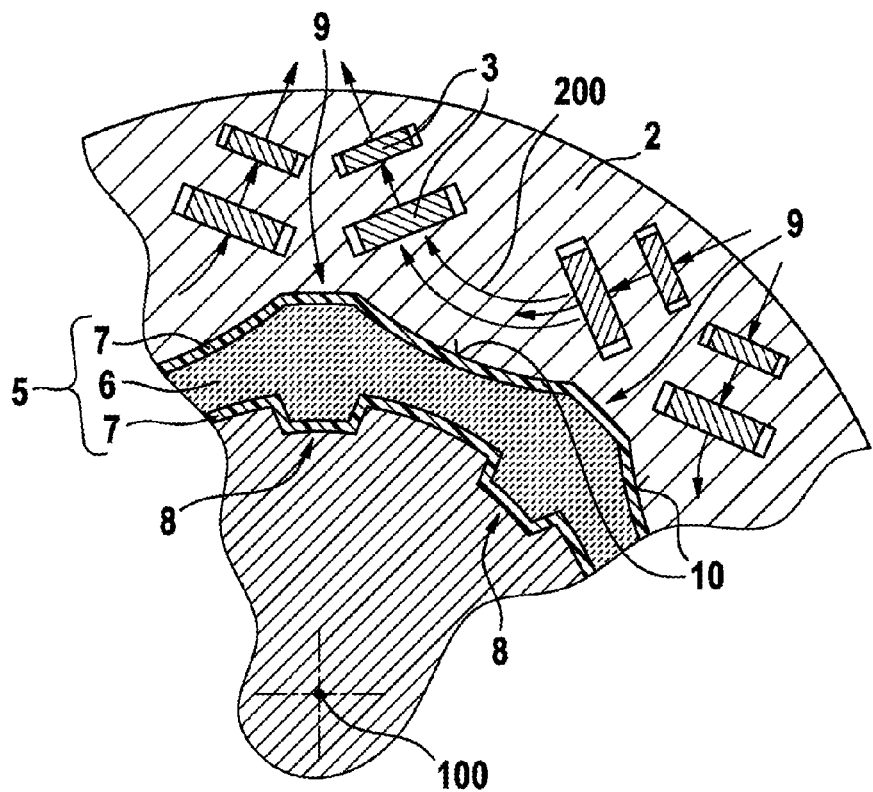
FIG. 4 illustrates a schematic view of a rotor of the electric motor in accordance with the exemplary embodiment in a third alternative.

FIGS. 2 to 4 illustrate different embodiments in the case of the arrangement of the permanent magnet 3 in the rotor main body 2. In each case, it is provided that the rotor main body has permanent magnets 3 that have a minimal radial spacing with respect to the center axis 100 of the shaft 4 or that have a minimal spacing with respect to the center axis 100 at a specific angle range. The ceramic core 6 and therefore the insulating body 5 are advantageously designed in the shape of a star and consequently have extreme sites 9 at which the insulating body 5 extends to the greatest extent in the radial direction. The same applies for the ceramic core 6 that likewise extends at the extreme sites 9 to the greatest extent in the radial direction. Consequently, the grooves 8 in the rotor main body 2 are correspondingly designed in order to render possible said extreme sites 9.

The extreme sites 9 are located in particular at an angle range at which the rotor main body 2 has a permanent magnet 3 with the smallest radial spacing with respect to the center axis 100. In FIG. 2, a single permanent magnet 3 is provided that has said smallest spacing with respect to the center axis 100. Consequently, the extreme site 9 extends at the angle range of this permanent magnet 3. In FIG. 3, all the permanent magnets 3 have the same spacing with respect to the center axis 100. Consequently, each extreme site 9 extends at each permanent magnet 3. FIG. 4 illustrates that in each case a site of two permanent magnets has the smallest spacing with respect to the center axis 100. In turn, the extreme sites 9 extend over the same angle range at these sites of the minimal spacing.

In order to optimize the magnetic flux 200, the insulating body 5 may preferably have a concave area 10 that extends between two extreme sites 9. The concave area 10 has either a round or an oval shape. In this manner, it is possible to guide the magnetic flux through the rotor main body in an optimal manner with the result that the magnetic flux 200 flows along a predefined path between two permanent magnets 3. An increased level of efficiency is realized by way of this optimization of the magnetic flux.

These said measures facilitate the guiding of the magnetic flux through the rotor main body. Consequently, in addition to the function of providing the rotationally-fixed connection, the grooves 8 in the rotor main body 2 also have the function of optimizing and guiding the magnetic flux 200. Such a function is not necessary in the case of the grooves 8 of the shaft 4. Therefore, the grooves 8 in the shaft 4 may be designed in an arbitrary manner and in particular optimized to the extent that the components of the electric motor 1 are mounted and manufactured in a simple and cost-effective manner.

Figure 5:
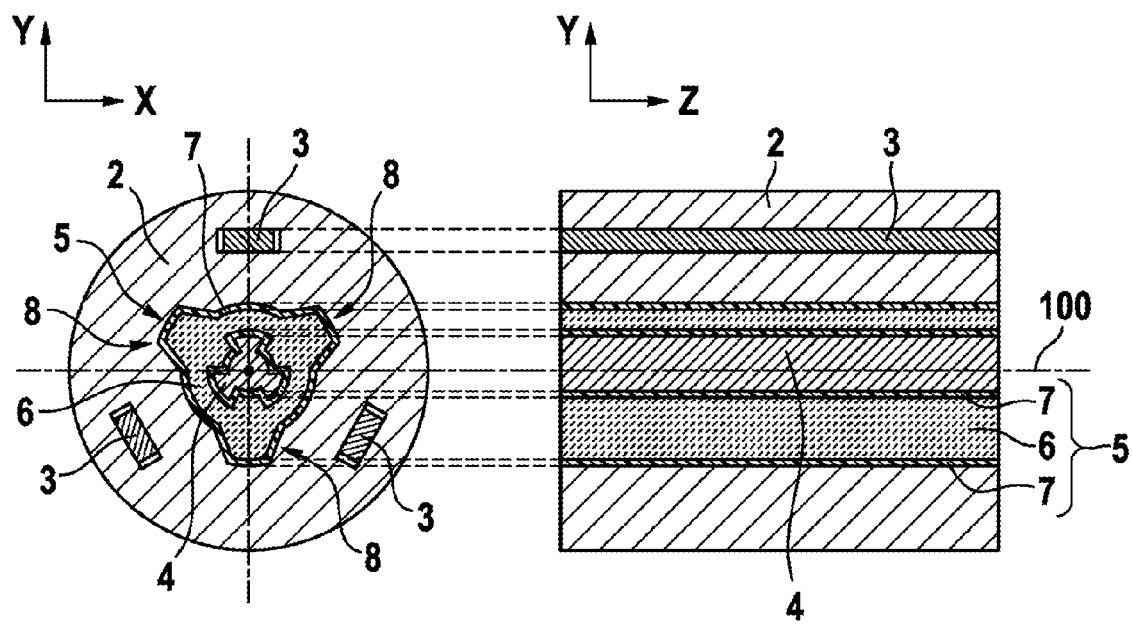
FIG. 5 illustrates a schematic view of a rotor of the electric motor in accordance with the exemplary embodiment in a fourth alternative.
Figure 6:
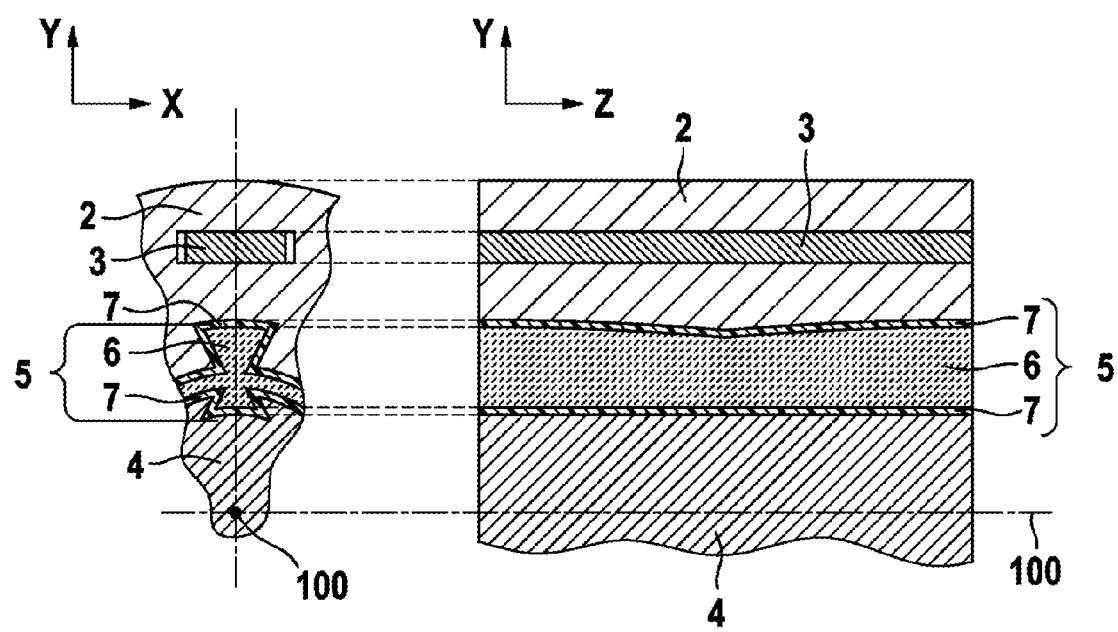
FIG. 6 illustrates a schematic view of a rotor of an electric motor in accordance with the exemplary embodiment in a fifth alternative.

The FIGS. 5 and 6 illustrate further exemplary embodiments as to how the rotor main body 2 may be attached to the shaft 4. FIG. 5 illustrates an example in which each groove 8 extends with a constant cross-section along the center axis 100 of the shaft 4. In contrast, FIG. 6 illustrates an example in which the cross-section of the grooves 8 changes over the center axis 100. This results in the insulating body 5 being axially fixed to the rotor main body 2. Consequently, the insulating body 5 is prevented from shifting out of place.

What is claimed is:

1. An electric motor (1) comprising:
   a rotor main body (2) to which a plurality of permanent magnets (3) or a rotor winding may be attached,
   a shaft (4) for receiving the rotor main body (2), and
   an insulating body (5) attached between the shaft (4) and the rotor main body (2) in order to electrically insulate the rotor main body (2) from the shaft (4),
   wherein the insulating body (5) engages at least in part into the shaft (4) and the rotor main body (2) in order to connect the shaft (4) and the rotor main body (2) in a rotationally-fixed manner,
   wherein the insulating body (5) is manufactured from a compound of a ceramic material and a synthetic material,
   wherein the insulating body (5) has a concave area (10) between two extreme sites (9) of the insulating body (5) located circumferentially from each other around a center axis (100) of the shaft (4), the two extreme sites (9) being locations of the insulating body (5) that extend farthest away from the center axis (100), and
   wherein one of the extreme sites (9) is provided at an angular location around the shaft (4) to minimize a distance from the one of the extreme sites (9) to one of the plurality of permanent magnets (3).

2. The electric motor (1) as claimed in claim 1, characterized in that the insulating body (5) has a ceramic core (6) having at least in part a synthetic material jacket (7).

3. The electric motor (1) as claimed in claim 2, characterized in that the ceramic core (6) is in the form of a ring in order to produce an interference fit assembly between the shaft (4) and the ceramic core (6).

4. The electric motor (1) as claimed in claim 1, characterized in that that the rotor main body (2) and/or the shaft (4) have at least one groove (8) that extends along the center axis (100) of the shaft (4), wherein the insulating body (5) engages into the at least one groove (8).

5. The electric motor (1) as claimed in claim 4, characterized in that the at least one groove (8) has a constant or changing cross-section along the center axis (100).

6. The electric motor (1) as claimed in claim 1, characterized in that the insulating body (5) extends in the shape of a star in the rotor main body (2).

7. The electric motor (1) as claimed in claim 1, wherein the concave area has a round or an oval shape.

8. The electric motor (1) as claimed in claim 1, characterized in that by way of the insulating body (5) a magnetic flux (200) is oriented within the rotor main body (2) along a predefined path.

9. The electric motor (1) as claimed in claim 1, characterized in that the synthetic material comprises a thermoplastic.

10. The electric motor (1) as claimed in claim 9, characterized in that the synthetic material also comprises a thermosetting plastic.

11. The electric motor (1) as claimed in claim 1, characterized in that the synthetic material comprises a thermosetting plastic.

12. The electric motor (1) as claimed in claim 1, wherein the concave area is a single arc that extends between the two extreme sites (9).

* * * * *